US011680027B2

(12) United States Patent
Mendenhall et al.

(10) Patent No.: US 11,680,027 B2
(45) Date of Patent: Jun. 20, 2023

(54) COOL BURNING HYDRATE FUELS IN GAS GENERANT FORMULATIONS FOR AUTOMOTIVE AIRBAG APPLICATIONS

(71) Applicant: AUTOLIV ASP, INC., Ogden, UT (US)

(72) Inventors: Ivan V. Mendenhall, Providence, UT (US); Gary K. Lund, Malad City, ID (US); Jadd Shelton, Newton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 1018 days.

(21) Appl. No.: 16/369,609

(22) Filed: Mar. 29, 2019

(65) Prior Publication Data

US 2020/0308079 A1 Oct. 1, 2020

(51) Int. Cl.
| C06B 41/00 | (2006.01) |
| C06B 23/04 | (2006.01) |
| C06B 33/10 | (2006.01) |
| C06D 5/06 | (2006.01) |
| B60R 21/264 | (2006.01) |

(52) U.S. Cl.
CPC ............ *C06B 41/00* (2013.01); *C06B 23/04* (2013.01); *C06B 33/10* (2013.01); *C06D 5/06* (2013.01); *B60R 21/2644* (2013.01)

(58) Field of Classification Search
None
See application file for complete search history.

(56) References Cited

U.S. PATENT DOCUMENTS

| 2,769,731 | A | 11/1956 | Schneid |
| 3,473,981 | A | 10/1969 | Butts et al. |
| 3,862,866 | A | 1/1975 | Timmerman et al. |
| 4,099,376 | A | 7/1978 | Japs |
| 6,039,820 | A | 3/2000 | Hinshaw et al. |
| 6,051,158 | A | 4/2000 | Taylor et al. |
| 6,241,281 | B1* | 6/2001 | Hinshaw ............... C06D 5/06 280/741 |
| 6,602,365 | B1 | 8/2003 | Mendenhall |
| 6,958,101 | B2 | 10/2005 | Mendenhall et al. |
| 8,231,747 | B2 | 7/2012 | Mendenhall et al. |
| 2003/0089883 | A1* | 5/2003 | Knowlton ............... C06B 23/04 252/181.1 |
| 2003/0094225 | A1 | 5/2003 | Knowlton et al. |
| 2004/0231767 | A1* | 11/2004 | Mendenhall ........ C06B 21/0075 149/19.2 |
| 2005/0127324 | A1 | 6/2005 | Wu |
| 2007/0131900 | A1* | 6/2007 | Wu ..................... C06D 5/06 252/186.1 |
| 2011/0025030 | A1 | 2/2011 | Mendenhall et al. |
| 2013/0139935 | A1* | 6/2013 | Baggett, Jr. ............... C06D 3/00 149/82 |
| 2014/0261927 | A1 | 9/2014 | Mendenhall et al. |
| 2015/0183930 | A1 | 7/2015 | Hsueh et al. |
| 2017/0218178 | A1* | 8/2017 | Akahira ................... C08K 3/11 |
| 2020/0308077 | A1 | 10/2020 | Mendenhall et al. |
| 2020/0308078 | A1 | 10/2020 | Mendenhall et al. |

FOREIGN PATENT DOCUMENTS

| EP | 3000799 A1 | 3/2016 |
| GB | 2200915 A | 8/1988 |
| JP | 2006076832 A | 3/2006 |
| JP | 2006290699 A | 10/2006 |
| JP | 2007-535977 A | 12/2007 |
| JP | 2008260658 A | 10/2008 |
| RU | 2247700 C2 | 3/2005 |

OTHER PUBLICATIONS

Crystal structure of the copper complex with cyanuric acid Cu(C3H2N3O3)2(H2O)2 Author Chang-Zhang Chen Chen, Chang-Zhang (Year: 1995).*
International Search Report and Written Opinion for International Patent Application No. PCT/US2020/017595, dated Jul. 1, 2020, 13 pages.
International Search Report and Written Opinion for International Application No. PCT/US2020/017591 dated May 28, 2020, 11 pages (ISA/EP).
International Search Report and Written Opinion for International Application No. PCT/US2020/017584 dated Jun. 16, 2020, 10 pages (ISA/EP).
Mendenhall, Ivan V. et al., U.S. Appl. No. 16/369,577, filed Mar. 29, 2019 entitled, "Gas Generant Compositions Comprising Melamine Oxalate for Use in Automotive Restraint Devices," 38 pages.
Mendenhall, Ivan V. et al., U.S. Appl. No. 16/369,591, filed Mar. 29, 2019 entitled, "Gas Generant Compositions Comprising a Thermally Stable Crystalline Hydrate Compound for Cooling Combustion Flame Temperature and Improving Ballistic Performance," 57 pages.

(Continued)

*Primary Examiner* — Aileen B Felton
(74) *Attorney, Agent, or Firm* — Harness, Dickey & Pierce, P.L.C.; Stephen T. Olson

(57) ABSTRACT

Cool burning hydrate fuels are provided for gas generant compositions for automotive inflatable restraint systems. The cool burning hydrate fuel is a compound comprising carbon, hydrogen, oxygen, a transition metal, and optionally nitrogen. The cool burning hydrate fuel is a transition metal salt of an organic compound or transition metal complex salt having (i) at least one functional group selected from the group consisting of: amide, imide, hydroxyl, carboxylic acid, and combinations thereof, (ii) an oxygen-to-carbon mole ratio of greater than or equal to about 0.5, (iii) at least one-half a water molecule of hydration, and (iv) an exothermic heat of formation of at least about −400 KJ/mole. The fuel may have a water release temperature of ≥about 140° C. The cool burning hydrate fuel may be one or more of copper cyanurate dihydrate, a copper melamine oxalate dihydrate, and a copper malonate hydrate.

19 Claims, No Drawings

(56) References Cited

OTHER PUBLICATIONS

Maria C. Lopez et al.; "Structural and Comparative Electrochemical Study of M(II) Oxalates, M=Mn, Fe, Co, Ni, Cu, Zn"; Journal of Power Sources; vol. 227; Apr. 1, 2013, pp. 65-71.
Office Action received from the Japanese Patent Office in corresponding application JP2021-555209 dated Oct. 25, 2022, and its English translation.

* cited by examiner

COOL BURNING HYDRATE FUELS IN GAS GENERANT FORMULATIONS FOR AUTOMOTIVE AIRBAG APPLICATIONS

FIELD

The present disclosure relates to a gas generant composition for an automotive inflatable restraint system having a cool burning hydrate fuel that includes a thermally stable hydrate with a water release temperature of greater than or equal to about 140° C.

BACKGROUND

This section provides background information related to the present disclosure which is not necessarily prior art.

Passive inflatable restraint systems have been used for over twenty-five years in various applications, such as automobiles. Certain types of passive inflatable restraint systems minimize occupant injuries by using a pyrotechnic gas generant to inflate an airbag cushion (e.g., gas initiators and/or inflators) or to actuate a seatbelt tensioner (e.g., micro gas generators), for example. Automotive airbag inflator performance and safety requirements are continually increasing to enhance passenger safety, while concurrently striving to increase functionality and reduce manufacturing costs.

Suitable gas generants provide sufficiently high gas output at a high mass flow rate in a desired time interval to achieve a required work impulse for the inflating device. One way of optimizing gas generant performance and reducing system cost is to reduce the combustion flame temperature of the gas generant formulation. This may seem counterintuitive because gas temperature influences the amount of work the generant gases can do. However, high gas temperatures can be undesirable because burns and related thermal damage can result. In addition, high gas temperatures can also lead to an excessive reliance or sensitivity of the gas to heat transfer and excessively rapid deflation profiles, which can be undesirable. In order to mitigate the effects of high combustion flame temperatures (for example, for purposes of the present disclosure, a high flame temperature may be considered anything in excess of 1700K at combustion), a significant portion of the mass of an inflator is often relegated to heat sink in combination with filtration systems. This detrimentally affects the weight of the inflator and thus the efficiency of the system.

In certain aspects, a desirable combustion flame temperature for a gas generant formulation used in a frontal application may be less than about 1900K (1,627° C.), optimally from about 1400K (1,127° C.) to about 1600K (1,327° C.). In addition to combustion flame temperature, two other important gas generant characteristics help to improve the efficiency of the inflator (and thus its size and weight) are the gas yield of the gas generant (in moles/100 grams formulation) and the ability of the solid combustion products to stay in a large consolidated mass that is easily filtered from the gas stream (slaggability).

For new advanced inflator designs, it is desirable to reduce or minimize filter components and heat sink requirements as much as possible. As part of these new designs, new cool burning gas generant formulations are advantageous because they reduce heat sink requirements and improve performance. Gas generant flame temperatures less than approximately 1700 K (1,427° C.) have been shown to enable inflator devices with reduced filtration that operate in a manner that provides adequate restraint and protection without the risk of burns or injury to an automobile occupant in the event of a crash. Consequently, it is desirable to achieve a high gas output at a high mass flow rate and at a relatively low flame temperature in a gas generant formulation used for automotive airbag applications.

SUMMARY

This section provides a general summary of the disclosure, and is not a comprehensive disclosure of its full scope or all of its features.

Advantageously, the present disclosure in certain variations provides a gas generant composition for an automotive inflatable restraint system comprising a cool burning hydrate fuel. The cool burning hydrate fuel comprises carbon, hydrogen, oxygen, and a transition metal. The cool burning hydrate fuel is a transition metal salt of an organic compound or a transition metal complex salt of an organic compound that:

(i) comprises at least one functional group selected from the group consisting of: amide, imide, hydroxyl, carboxylic acid, and combinations thereof;

(ii) has an oxygen-to-carbon mole ratio of greater than or equal to about 0.5;

(iii) comprises at least one-half a water molecule of hydration; and (iv) has an exothermic heat of formation of at least about −400 KJ/mole.

In certain aspects, the cool burning hydrate fuel further comprises nitrogen.

In certain aspects, the cool burning hydrate fuel has a water release temperature of greater than or equal to about 140° C. measured by differential scanning calorimetry (DSC) with a heating rate of 5° C./minute with a tolerance of ±0.1° C./minute.

In certain aspects, the cool burning hydrate fuel is selected from the group consisting of: a copper cyanurate dihydrate, a copper melamine oxalate dihydrate, a copper malonate hydrate, and combinations thereof.

In certain aspects, the cool burning hydrate fuel is present at greater than or equal to about 5% by weight to less than or equal to about 50% by weight of the gas generant composition.

In certain further aspects, the gas generant further comprises a co-fuel present at greater than or equal to about 10% to less than or equal to about 50% by weight of the total gas generant composition. The gas generant also comprises an oxidizer present at greater than or equal to about 25% to less than or equal to about 70% by weight of the total gas generant composition. The gas generant further comprises one or more gas generant additives present at greater than or equal to 0% to less than or equal to about 15% by weight of the total gas generant composition.

In certain aspects, the cool burning hydrate fuel is present at greater than or equal to about 5% by weight to less than or equal to about 30% by weight of the gas generant composition.

In certain aspects, the gas generant composition has a maximum flame temperature at combustion ($T_c$) of greater than or equal to about 1400K (1,127° C.) to less than or equal to about 1700K (1,427° C.).

In certain aspects, the gas generant composition has one or more of the following:

(i) a gas yield of the gas generant composition of greater than or equal to about 5.7 moles/100 cm$^3$;

(ii) a linear burn rate of greater than or equal to about 18 mm per second at a pressure of about 10 megapascals (MPa); or (iii) a linear burn rate pressure exponent of less than or equal to about 0.35.

In certain aspects, the gas generant composition further comprises a co-fuel selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof.

In certain aspects, the gas generant composition further comprises an oxidizer selected from the group consisting of: basic copper nitrate, alkali metal or alkaline earth metal nitrates, alkali metal, alkaline earth metal, or ammonium perchlorates, metal oxides, and combinations thereof.

In certain aspects, the gas generant composition further comprises a co-fuel comprising guanidine nitrate present at greater than or equal to about 15% to less than or equal to about 50% by weight of the total gas generant composition and an oxidizer comprising basic copper nitrate present at greater than or equal to about 25% to less than or equal to about 70% by weight of the total gas generant composition.

Advantageously, the present disclosure in certain other variations provides a cool burning gas generant composition for an automotive inflatable restraint system comprising a cool burning hydrate fuel selected from the group consisting of: a copper cyanurate dihydrate, a copper melamine oxalate dihydrate, a copper malonate hydrate, and combinations thereof. A maximum flame temperature of the cool burning gas generant composition at combustion ($T_a$) is less than or equal to about 1700K (1,427° C.).

In certain aspects, the cool burning hydrate fuel is present at greater than or equal to about 5% by weight to less than or equal to about 50% by weight of the cool burning gas generant composition.

In certain aspects, the cool burning gas generant composition comprises a co-fuel present at greater than or equal to about 10% to less than or equal to about 50% by weight of the total gas generant composition. The cool burning gas generant composition also comprises an oxidizer present at greater than or equal to about 25% to less than or equal to about 70% by weight of the total gas generant composition. The cool burning gas generant composition also comprises one or more gas generant additives present at greater than or equal to 0% to less than or equal to about 15% by weight of the total gas generant composition.

In certain aspects, the cool burning gas generant composition has one or more of the following:
(i) a gas yield of the cool burning gas generant composition of greater than or equal to about 5.7 moles/100 cm$^3$;
(ii) a linear burn rate of greater than or equal to about 18 mm per second at a pressure of about 10 megapascals (MPa); or
(iii) a linear burn rate pressure exponent of less than or equal to about 0.35.

In certain aspects, the cool burning gas generant composition further comprises a co-fuel selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof. The cool burning gas generant composition also comprises an oxidizer is selected from the group consisting of: basic copper nitrate, alkali metal or alkaline earth metal nitrates, alkali metal, alkaline earth metal, or ammonium perchlorates, metal oxides, and combinations thereof.

Advantageously, the present disclosure in certain further variations provides a cool burning gas generant composition for an automotive inflatable restraint system comprising copper cyanurate dihydrate, a co-fuel comprising guanidine nitrate, an oxidizer comprising basic copper nitrate, one or more gas generant additives, wherein a maximum flame temperature at combustion ($T_c$) is less than or equal to about 1700K (1,427° C.).

In certain aspects, the copper cyanurate dihydrate is present at greater than or equal to about 5% by weight to less than or equal to about 30% by weight of the cool burning gas generant composition. The co-fuel comprising guanidine nitrate is present at greater than or equal to about 15% to less than or equal to about 50% by weight of the total cool burning gas generant composition. The oxidizer comprising basic copper nitrate present at greater than or equal to about 25% to less than or equal to about 70% by weight of the total cool burning gas generant composition. Further, the one or more gas generant additives are present at greater than or equal to 0% to less than or equal to about 15% by weight of the total cool burning gas generant composition.

In certain aspects, the cool burning gas generant composition has one or more of the following:
(i) a gas yield of the cool burning gas generant composition of greater than or equal to about 5.7 moles/100 cm$^3$;
(ii) a linear burn rate of greater than or equal to about 18 mm per second at a pressure of about 10 megapascals (MPa); or
(iii) a linear burn rate pressure exponent of less than or equal to about 0.35.

Further areas of applicability will become apparent from the description provided herein. The description and specific examples in this summary are intended for purposes of illustration only and are not intended to limit the scope of the present disclosure.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

The present disclosure contemplates a composition for gas generant that can be in the form of a solid grain, a pellet, a tablet, or the like. As the gas generant burns it creates a gas or effluent for inflation that is directed to an inflating device (e.g., airbag) within the inflatable restraint system. Various different gas generant compositions are used in vehicular occupant inflatable restraint systems. Gas generant material selection involves various factors, including meeting current industry performance specifications, guidelines and standards, generating safe gases or effluents, handling safety of the gas generant materials, durational stability of the materials, and cost-effectiveness in manufacture, among other considerations. It is preferred that the gas generant compositions are safe during handling, storage, and disposal, and preferably are azide-free.

In various aspects, the gas generant typically includes at least one fuel component and at least one oxidizer component, and may include other minor ingredients, that once ignited combust rapidly to form gaseous reaction products (e.g., $CO_2$, $H_2O$, and $N_2$). One or more fuel compounds undergo rapid combustion to form heat and gaseous products; e.g., the gas generant burns to create heated inflation gas for an inflatable restraint device or to actuate a piston. The gas-generating composition also includes one or more oxidizing components, where the oxidizing component reacts with the fuel component in order to generate the gas product. "Slag" or "clinker" is another name for solid combustion products formed during combustion of the gas generant material. Ideally, the slag will maintain the original shape of the gas generant (e.g., grain, pellet, or tablet) and be large and easily filtered. This is particularly important when the inflator design includes a reduced mass filtration system for the purpose of reducing the inflator size and weight such as can be used with cool burning gas generant formulations.

Advanced inflator design concepts incorporate reduced filter and heat sink mass. Use of cool burning gas generant formulations reduces heat sink requirements. Additionally, because filter mass is reduced, it is desirable to have a cool burning gas generant that slags very well. By "slagging," it is meant that certain solid combustion products generated during burning of the gas generant form a large integral solid mass that is retained inside the combustion chamber during combustion, rather than passing through the filter into the airbag. Slagging agents can be used to achieve this effect. A slagging agent is a compound or material, usually inert to combustion, which melts at combustion temperatures and agglomerates or collects all of the solid combustion products together. Examples of conventional slagging agents are silicon dioxide, aluminum oxide, glass and other metal oxides that melt at or near the combustion flame temperature.

As noted above, one way of optimizing gas generant performance and reducing system cost of gas generants for passive restraint systems is to reduce the combustion flame temperature of the gas generant formulation. In an efficient inflator design, the amount of screen pack used would be sufficient to filter the gas stream and to cool the gas stream from combustion for a desired quantity of gas generant to a desired temperature before entering an airbag. The desired combustion flame temperature for a gas generant formulation used in a frontal automotive inflator application is generally in a range of greater than or equal to about 1400K (1,127° C.) to less than or equal to 1900K (1,627° C.). In addition to combustion flame temperature, as noted above, two other important gas generant characteristics that help to improve the efficiency of the inflator and thus its size and weight are the gas yield of the gas generant and the ability of the solid combustion products to form a slag and thus stay in a large consolidated mass that is easily filtered from the gas stream.

One current way to obtain cool burning gas generant formulations is to use large particle endothermic coolants, such as aluminum hydroxide, which is described in co-owned U.S. Patent Publication No. 2014/0261927 entitled "Enhanced Slag Formation For Copper-Containing Gas Generants," the relevant portions of which are incorporated herein. The large particle size of the aluminum hydroxide allows it to be used at high levels (e.g., about 10-20%) without adversely affecting the burning rate of the overall gas generant formulation. In addition, decomposition of aluminum hydroxide releases water vapor, which participates in inflation of the airbag and helps to maintain a high gas yield from the gas generant formulation. These formulations slag very well. Although use of aluminum hydroxide is an effective technique for cooling a gas generant, the ballistic performance of the formulation is quite sensitive to the particle size distribution of the aluminum hydroxide coolant, thus requiring strict control of the particle size distribution to minimize variation from batch to batch.

The present disclosure provides alternative cool burning gas generant compositions that allow low flame temperatures at combustion (e.g., ≤about 1700K (1,427° C.)) to be obtained while maintaining good performance, especially those that can employ certain co-fuel and oxidizer combinations, like basic copper nitrate and guanidine nitrate.

In various aspects, the present disclosure contemplates a gas generant composition for an automotive restraint/air bag system that comprises a cool burning hydrate fuel compound or complex. The cool burning hydrate fuel is a transition metal salt of an organic compound or a transition metal complex salt of an organic compound. The cool burning fuel comprises carbon, hydrogen, oxygen, a transition metal, and may contain nitrogen. The cool burning hydrate fuel may thus be a transition metal salt of an organic compound or a transition metal complex salt. Transition metals may be any metal selected from Groups 3 to 12 of the IUPAC Periodic Table. Suitable examples of transition metals include copper (Cu), manganese (Mn), iron (Fe), cobalt (Co), and/or zinc (Zn).

As noted above, the organic portion of the compound contains the following elements: carbon (C), hydrogen (H), and oxygen (O). In certain variations, the organic portion of the compound contains the following elements carbon (C), hydrogen (H), nitrogen (N), and oxygen (O).

The organic portion of the cool burning hydrate fuel comprises at least one functional group selected from the group consisting of: amide, imide, hydroxyl, carboxylic acid, and combinations thereof. As will be described further below, suitable organic anions or organic complexes include cyanurate, melamine oxalate, and malonate.

In certain aspects, the cool burning hydrate fuel, and more specifically, the organic portion of the cool burning hydrate fuel, (iii) has an oxygen-to-carbon mole ratio of greater than or equal to about 0.5.

In certain other aspects, the cool burning hydrate fuel (iv) comprises at least one-half of a water molecule of hydration (stoichiometrically). Further, the cool burning hydrate fuel has a water release temperature of greater than or equal to about 140° C. when heated at a uniform heating rate of 5° C./minute with a tolerance of +/−0.1° C./min in a differential scanning calorimeter (DSC). For purposes of this test, a 2 mg±0.1 mg powder sample could be used. A DSC device from TA Instruments is suitable for this test. The water release temperature is the temperature at which water incorporated into a salt will start to dissociate from the salt when heated at a uniform heating rate in a DSC. This can be tested when a stoichiometric amount of water is incorporated into a salt with sufficient attractive forces. In certain aspects, the cool burning hydrate fuel compound has at least one molecule of hydration and optionally two or more molecules of hydration, depending on the organic anion or salt. The water molecule chemically bound to the transition metal salt or complex has sufficient bond strength such that the water molecule does not dissociate from the salt until at least 140° to 150° C. when heated at a uniform heating rate of 5° C./minute in a differential scanning calorimeter (DSC). In the context of a gas generant formulation, such a hydrate can be considered to form thermally stable hydrate salts. In most hydrated salts, the chemical bonds that attach the water molecules to the salt are quite weak. Thus, water dissociates from the molecule at approximately 100° C., making such hydrate compounds unsuitable for automotive applications, because gas generants are subjected to accelerated heat aging conducted at temperatures as high as 110° C. or may experience extreme duty conditions that may exceed 100° C., for example. However, in the cool burning hydrate fuel compounds provided by the present teachings, the bonds are significantly stronger and the water does not dissociate from the salt until temperatures reach a minimum of about 140° C. to about 150° C., rendering them thermally stable for use as a gas generant in an automotive system. A significant amount of energy is absorbed in the removal of the water molecules. Further, once removed, the water molecules contribute to the gas yield of the formulation, such that these fuel compounds provide uniquely cool burning, high gas yield fuels for automotive gas generating compositions.

Accordingly, in certain variations, a gas generant composition for an automotive inflatable restraint system is provided that comprises a fuel compound having a thermally stable hydrate compound that has a water release temperature of greater than or equal to about 140° C., optionally greater than or equal to about 150° C., optionally greater than or equal to about 160° C., optionally greater than or equal to about 165° C., and in certain variations, optionally greater than or equal to about 170° C.

In other aspects, the cool burning hydrate fuel (v) has an exothermic heat of formation of at least about −400 KJ/mole, where the sign is negative by convention indicating an exothermic event/reaction (such that the more negative the value, the greater the exothermic heat of formation). In certain variations, the cool burning hydrate fuel (v) is at least this exothermic and may be more exothermic by having a more negative heat of formation, for example, at least about −410 KJ/mole, optionally at least about −425 KJ/mole, and in certain variations, optionally at least about −450 KJ/mole.

In various aspects, the cool burning hydrated fuel compounds of the present disclosure possess each of the following characteristics. The cool burning hydrated fuel compounds are transition metal salts of an organic compound or transition metal complex salts. The organic portion of the compound contains carbon, hydrogen, oxygen, and optionally nitrogen and further contains at least one functional group selected from the list of amide, imine, hydroxyl, or carboxylic acid. The cool burning hydrate fuel compound has a molar ratio of oxygen to carbon of greater than 0.5 and has an exothermic heat of formation of at least −400 KJ/mole. In addition, these cool burning compounds have a minimum of one half of a water molecule chemically bound to the transition metal salt, desirably having sufficient bond strength such that the water molecule does not dissociate from the salt until at least about 140° C. to 150° C.

In certain variations, the cool burning hydrate fuel compound comprises a copper cyanurate dihydrate. The copper cyanurate dihydrate may be represented by the structure:

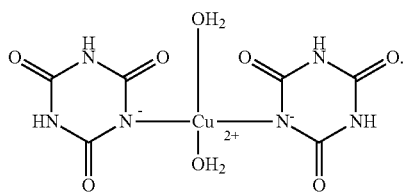

The chemical abstract service (CAS) number is 63516-75-6 and this compound is also referred to as copper, diaquabis (1,3,5-triazine-2,4,6(1H, 3H,5H-trionato-N1)-,(SP-4-1)-9CI. This compound has two water molecules of hydration (bonded to each molecule of copper cyanurate). The copper cyanurate dihydrate is a reaction product of one equivalent of cupric hydroxide and one equivalent of cyanuric acid, thus forming a hydrated copper II salt of cyanuric acid that is a thermally stable hydrate. The water molecules (of hydration) do not dissociate from the salt until approximately 200° C. A significant amount of energy is absorbed in the removal of the water molecules and once removed; the water molecules contribute to the gas yield of the gas generant formulation thus providing a cool burning hydrate fuel.

In certain other variations, the cool burning hydrate fuel compound comprises a copper melamine oxalate dihydrate complex. The copper melamine oxalate dihydrate has the following stochiometry: $[3Cu(C_2O_4)](C_3H_6N_6)_2 \cdot 2H_2O$. This compound has two water molecules of hydration (bonded to each molecule of copper melamine oxalate). The product may be formed by the reaction of 3 equivalents of cupric hydroxide with one equivalent of 2:3 melamine oxalate. Copper melamine oxalate dihydrate has a thermally stable water of hydration that has a water release temperature of about 225° C. In certain other variations, the cool burning hydrate fuel compound comprises a copper malonate hydrate. The copper malonate hydrate may be represented by the following structure:

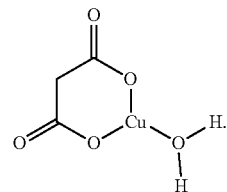

This compound has one water molecule of hydration (bonded to each molecule of copper malonate hydrate). The compound may be a product formed by the reaction of 1 equivalent of cupric hydroxide with one equivalent of malonic acid. Copper malonate hydrate has a thermally stable water of hydration that has a water release temperature of about 225° C.

Thus, in certain aspects, the cool burning hydrate fuel compounds of the present disclosure may be selected from the group consisting of: copper cyanurate dihydrate, copper melamine oxalate dihydrate, copper malonate hydrate, and combinations thereof.

The present disclosure provides alternative cool burning gas generant compositions that allow low flame temperatures at combustion, for example, having a maximum combustion temperature of less than or equal to about 1700 K (1,427° C.) to be obtained while maintaining good performance, especially those that can employ certain fuel and oxidizer combinations, like basic copper nitrate and guanidine nitrate. In certain aspects, a maximum combustion temperature of the cool burning gas generant provided by the present disclosure may be greater than or equal to about 1400K (1,127° C.) to less than or equal to about 1600K (1,327° C.)). In view of the fact that these cool burning hydrate fuel compounds form a thermally stable hydrate, their cooling properties are superior, and permit greater amounts of co-fuels, like guanidine nitrate, to be used in the gas generant formulation while still providing good performance, including adequate gas yields. As discussed further below, the cool burning hydrate fuel compound participates in combustion (e.g., as a fuel) and can eliminate the need to use a large particle size endothermic coolant. Further, the cool burning hydrate fuel compound has a high cooling capacity, which allows relatively small amounts of the compound to cool the formulation to desired temperatures, thereby maintaining a high gas yield. While other cool burning co-fuels would appear to potentially meet these requirements for a cool burning gas generant, many of these alternative options do not provide a formulation that has desirable ballistic characteristics, including excessive pressure sensitivity of burn rate, low burn rates, and/or insufficient gas yields. However, in accordance with the present disclosure, cool burning hydrate fuel compound of the present disclosure serve as a fuel that can fulfill all of these performance criteria to provide cool burning gas generant compositions.

In certain aspects, the cool burning hydrate fuel compounds of the present disclosure may be selected from the group consisting of: copper cyanurate dihydrate, copper melamine oxalate dihydrate, copper malonate hydrate, and combinations thereof. The cool burning hydrate fuel may be present at greater than or equal to about 5% by weight to less than or equal to about 50% by weight of the gas generant composition, optionally at greater than or equal to about 5% by weight to less than or equal to about 45% by weight of the gas generant composition, optionally at greater than or equal to about 5% by weight to less than or equal to about 40% by weight of the gas generant composition, optionally at greater than or equal to about 5% by weight to less than or equal to about 35% by weight of the gas generant composition, optionally at greater than or equal to about 5% by weight to less than or equal to about 30% by weight of the gas generant composition, and optionally at greater than or equal to about 10% by weight to less than or equal to about 30% by weight of the gas generant composition.

While not limited to cool burning gas generant compositions, in certain aspects, the gas generant composition includes a cool burning hydrate fuel compound that can be used as a co-fuel in a relatively cool burning gas generant composition. The gas generant composition may also comprise another primary fuel, one or more additional co-fuels, along with at least one oxidizer. Most fuels known in the art can be used with the present technology and are generally selected to impart certain desirable characteristics to the gas generant formulation, such as gas yield, burning rate, thermal stability, and low cost. These fuels can be organic compounds containing two or more of the elements: carbon (C), hydrogen (H), nitrogen (N), and oxygen (O). The fuels can also include transition metal salts and transition metal nitrate complexes. In certain variations, preferred transition metals are copper and/or cobalt. In accordance with certain aspects of the present teachings, a co-fuel is selected for the inventive gas generant compositions so that when combusted with certain oxidizers comprising copper, such as basic copper nitrate, a resulting maximum combustion flame temperature ($T_c$) falls within a range of greater than or equal to about 1400K (1,127° C.) to less than or equal to 1700K (1,427° C.).

Examples of fuels useful for gas generants according to the present teachings are selected from the group consisting of guanidine nitrate, diammonium 5,5'-bitetrazole (DABT), copper bis guanylurea dinitrate, hexamine cobalt (III) nitrate, copper diammine bitetrazole, and combinations thereof. Fuels may be used singly or in combination with other co-fuels in addition to the cool burning hydrate fuel compound to impart the desired combustion characteristics. In addition to the cool burning hydrate fuel compound, the cool burning gas generant may comprise such additional fuel(s) at greater than or equal to about 10% by weight to less than or equal to about 50% by weight of the total gas generant composition. A suitable cool burning gas generant composition optionally includes a total amount of fuels, including the cool burning hydrate fuel compound, of greater than or equal to about 15% to less than or equal to about 80% by weight, optionally greater than or equal to about 25% to less than or equal to about 70%, optionally greater than or equal to about 30% to less than or equal to about 55% of all fuel components in the total gas generant composition.

Certain suitable oxidizers for the gas generant compositions of the present disclosure include, by way of non-limiting example, alkali metal (e.g., elements of Group 1 of IUPAC Periodic Table, including Li, Na, K, Rb, and/or Cs), alkaline earth metal (e.g., elements of Group 2 of IUPAC Periodic Table, including Be, Ng, Ca, Sr, and/or Ba), and ammonium nitrates, nitrites, and perchlorates; metal oxides (including Cu, Mo, Fe, Bi, La, and the like); basic metal nitrates (e.g., elements of transition metals of Row 4 of IUPAC Periodic Table, including Mn, Fe, Co, Cu, and/or Zn); transition metal complexes of ammonium nitrate (e.g., elements selected from Groups 3-12 of the IUPAC Periodic Table); metal ammine nitrates, metal hydroxides, and combinations thereof. One or more co-fuel/oxidizers are selected along with the fuel component to form a gas generant that upon combustion achieves an effectively high burn rate and gas yield from the fuel. One non-limiting, specific example of a suitable oxidizer includes basic copper nitrate. The gas generant may include combinations of oxidizers, such that the oxidizers may be nominally considered a primary oxidizer, a second oxidizer, and the like.

Oxidizing agents may be respectively present in a gas generant composition in an amount of less than or equal to about 70% by weight of the gas generating composition; optionally less than or equal to about 60% by weight; optionally less than or equal to about 50% by weight; optionally less than or equal to about 40% by weight; optionally less than or equal to about 30% by weight; optionally less than or equal to about 25% by weight; optionally less than or equal to about 20% by weight; and in certain aspects, less than or equal to about 15% by weight of the gas generant composition.

In certain variations of the present disclosure, the gas generant composition comprises a total amount of oxidizers of greater than or equal to about 25% to less than or equal to about 70% by weight and in certain variations, optionally greater than or equal to about 30% to less than or equal to about 60% by weight of the total gas generant composition. Where a secondary oxidizer, such as a perchlorate, is included in combination with a primary oxidizer, such as basic copper nitrate, it may be limited to an amount of greater than or equal to about 1% by weight to less than or equal to about 10% by weight of the total gas generant composition to retain the cool burning properties of the gas generant.

A gas generant composition may optionally include additional components known to those of skill in the art. Such additives typically function to improve the handling or other material characteristics of the slag, which remains after combustion of the gas generant material; and improve ability to handle or process pyrotechnic raw materials. By way of non-limiting example, additional ingredients for the gas generant composition may be selected from the group consisting of: flow aids, pressing aids, metal oxides, and combinations thereof If minor ingredients or additives are included in the gas generant, they may be cumulatively present at less than or equal to about 15% by weight of the total gas generant composition, optionally less than or equal to about 10% by weight of the total gas generant composition and in certain variations, optionally less than or equal to about 5% by weight of the total gas generant composition. By way of example, such an additive may be selected from the group consisting of: flow aids, press aids, slagging agents, coolants, metal oxides, and any combinations thereof. Where present in a gas generant composition, in certain variations each respective additive may be present at greater than or equal to 0% to less than or equal to about 5% by weight; optionally greater than or equal to about 0.1% to less than or equal to about 4% by weight, and in certain variations, optionally greater than or equal to about 0.5% to less than or equal to about 3% by weight of the gas generant, so that the total amount of additives is less than or equal to about 4%.

Press aids used during compression processing, include lubricants and/or release agents, such as graphite, calcium stearate, magnesium stearate, molybdenum disulfide, tungsten disulfide, graphitic boron nitride, may be optionally included in the gas generant compositions, by way of non-limiting example. Conventional flow aids may also be employed, such as high surface area fumed silica.

Slag forming agents or slagging agents may be a refractory compound, e.g., silicon dioxide and/or aluminum oxide. Examples of conventional slagging agents are aluminum, silicon, and titanium dioxides, refractory materials or other metal oxides that melt at or near the combustion flame temperature. Coolants for lowering gas temperature include basic copper carbonate or other suitable carbonates.

The gas generant compositions may optionally include a metal oxide that serves as a viscosity-modifying compound or an additional slag-forming agent (in addition to the endothermic slag-forming component described above). Suitable metal oxides may include silicon dioxide, cerium oxide, ferric oxide, titanium oxide, zirconium oxide, bismuth oxide, molybdenum oxide, lanthanum oxide and the like.

In certain aspects, a cool burning gas generant may be considered to have a maximum flame temperature at combustion ($T_c$) of less than approximately 1900K (1,627° C.), optionally less than or equal to approximately 1700 K (1,427° C.), and in certain variations, optionally less than approximately 1600K (1,327° C.). In certain aspects, the cool burning gas generants of the present disclosure have a relatively low maximum flame temperatures at combustion ($T_c$), for example, greater than or equal to about 1400K (1,127° C.) to less than or equal to about 1700K (1,427° C.) and in certain variations, optionally greater than or equal to about 1400K (1,127° C.) to less than or equal to about 1600K (1,327° C.). This allows higher gas yields to be achieved at these flame temperatures than would be achieved with traditional compounds.

Such cool burning gas generants have been shown to enable inflator devices with reduced filtration, which operate in a manner that provides adequate restraint and protection, without the risk of burns or injury to an automobile occupant in the event of a crash. Thus, minimizing flame temperature is advantageous. However, the cool burning hydrate fuel compound may be used in any gas generant and is not necessarily limited to cool burning gas generants.

In accordance with certain aspects of the present teachings, an improved gas generant composition is provided that includes a cool burning hydrate fuel compound with a water release temperature of greater than or equal to about 140° C. that has a volumetric gas yield of optionally greater than or equal to about 5.7 moles/100 cm$^3$ of gas generant. The product of gravimetric gas yield and density is a volumetric gas yield. In certain embodiments, the volumetric gas yield is greater than or equal to about 5.8 moles/100 cm$^3$ of gas generant, optionally greater than or equal to about 5.9 moles/100 cm$^3$ of gas generant, optionally greater than or equal to about 6.0 moles/100 cm$^3$ of gas generant, optionally greater than or equal to about 6.1 moles/100 cm$^3$ of gas generant, and in certain variations, optionally greater than or equal to about 6.2 moles/100 cm$^3$ of gas generant.

In certain variations, the gas generant has a mass density of greater than about 2 g/cm$^3$, optionally greater than or equal to about 2.1 g/cm$^3$, and in certain variations, optionally greater than or equal to about 2.2 g/cm$^3$.

In addition to improved gas generant performance with respect to volumetric gas yield, relative quickness as determined by observed burning rate is also important in inflator gas generant design. In general, a burn rate for a gas generant composition can be represented by a simplified equation:

$$r_b = k(P)^n \quad \text{(Eqn. 1)}$$

where $r_b$ is burn rate (linear); k is a constant; P is pressure, and n is a pressure exponent, where the pressure exponent is the slope of a linear regression line drawn through the log-log plot of linear burn rate ($r_b$) versus pressure (P).

In various embodiments, the gas generant provided by the present disclosure has a desirably high burning rate that enables desirable pressure curves for inflation of an airbag. A linear burn rate "$r_b$" for a gas generant material may be expressed in length per time at a given pressure. In accordance with various aspects of the present disclosure, the gas generant has a linear burn rate of greater than or equal to about 18 mm per second at a pressure of about 21 megapascals (MPa). In certain embodiments, the burn rate for the gas generant is greater than or equal to about 19 mm per second at a pressure of about 21 MPa, optionally greater than or equal to about 20 mm per second at a pressure of about 21 MPa, optionally greater than or equal to about 21 mm per second at a pressure of about 21 MPa, optionally greater than or equal to about 22 mm per second at a pressure of about 2 MPa, and optionally greater than or equal to about 23 mm per second at a pressure of about 21 MPa.

In certain aspects, a gas generant material having an acceptable pressure sensitivity has a linear burning rate slope or pressure exponent (n) of less than or equal to about 0.35, optionally less than or equal to about 0.3. A material having a linear burn rate slope of less than or equal to about 0.35 fulfills hot to cold performance variation requirements, and can reduce performance variability and pressure requirements of the inflator as well. Thus, in various aspects, it is desirable that the gas generant materials have a constant slope over the pressure range of inflator operation, which is typically about 1,000 psi (about 6.9 MPa) to about 5,000 psi (about 34.5 MPa) and desirably has a constant slope that is less than or equal to about 0.35.

As discussed further below, the cool burning hydrate fuel compound or complex participates in combustion (e.g., as a fuel) and can eliminate the need to use a large particle size endothermic coolant. Further, the cool burning hydrate fuel has a high cooling capacity, which allows relatively small amounts of the compound to cool the formulation to desired temperatures, thereby maintaining a high gas yield.

In certain embodiments, a gas generant comprises a fuel in the form of a cool burning hydrate compound described above, a second fuel (e.g., a co-fuel), and one or more oxidizers. The gas generant composition may comprise a basic metal nitrate oxidizer, as described above, and a nitrogen-containing co-fuel like guanidine nitrate, in addition to the cool burning hydrate fuel compound. In certain variations, a cool burning gas generant comprises a cool burning hydrate fuel compound selected from the group consisting of: copper cyanurate dihydrate, copper melamine oxalate dihydrate, copper malonate hydrate, and combinations thereof, a co-fuel, and one or more oxidizers. The gas generant composition may be cool burning gas generant with a maximum flame temperature at combustion ($T_c$) of less than or equal to about 1700K (1,427° C.). The gas generant has a linear burn rate of greater than or equal to about 18 mm per second at a pressure of about 21 megapascals (MPa). Further, the gas generant has a gas yield of the gas generant composition of greater than or equal to about 5.7 moles/100 cm$^3$.

A gas generant may comprise a cool burning hydrate fuel compound at greater than or equal to about 5% by weight to less than or equal to about 50% by weight of the gas generant composition, and may further comprise a co-fuel present at greater than or equal to about 10% to less than or equal to about 50% by weight of the total gas generant composition;

an oxidizer present at greater than or equal to about 25% to less than or equal to about 70% by weight of the total gas generant composition; and one or more gas generant additives present at greater than or equal to 0% to less than or equal to about 15% by weight of the total gas generant composition. In certain variations, the cool burning hydrate fuel may be present at greater than or equal to about 5% by weight to less than or equal to about 30% by weight of the gas generant composition.

In another variation, a gas generant comprises a cool burning hydrate fuel compound at greater than or equal to about 5% by weight to less than or equal to about 50% by weight of the gas generant composition, and may further comprise guanidine nitrate co-fuel present at greater than or equal to about 10% to less than or equal to about 50% by weight of the total gas generant composition; basic copper nitrate oxidizer present at greater than or equal to about 25% to less than or equal to about 70% by weight of the total gas generant composition; and one or more gas generant additives present at greater than or equal to 0% to less than or equal to about 15% by weight of the total gas generant composition. In certain variations, the cool burning hydrate fuel may be present at greater than or equal to about 5% by weight to less than or equal to about 30% by weight of the gas generant composition. The cool burning hydrate fuel compound may be selected from the group consisting of: copper cyanurate dihydrate, copper melamine oxalate dihydrate, copper malonate hydrate, and combinations thereof. Such a gas generant may be cool burning and have a maximum flame temperature at combustion ($T_c$) of greater than or equal to about 1400K (1,127° C.) to less than or equal to about 1700K (1,427° C.).

In yet another variation, a gas generant comprises a cool burning hydrate fuel compound at greater than or equal to about 5% by weight to less than or equal to about 50% by weight of the gas generant composition, optionally greater than or equal to about 5% by weight to less than or equal to about 30% by weight of the gas generant composition, and may further comprise guanidine nitrate co-fuel present at greater than or equal to about 10% to less than or equal to about 30% by weight of the total gas generant composition; basic copper nitrate oxidizer present at greater than or equal to about 25% to less than or equal to about 70% by weight of the total gas generant composition; and one or more gas generant additives present at greater than or equal to 0% to less than or equal to about 15% by weight of the total gas generant composition. In certain variations, the cool burning hydrate fuel may be present at greater than or equal to about 5% by weight to less than or equal to about 30% by weight of the gas generant composition. The cool burning hydrate fuel compound may be selected from the group consisting of: copper cyanurate dihydrate, copper melamine oxalate dihydrate, copper malonate hydrate, and combinations thereof. Such a gas generant may be cool burning and have a maximum flame temperature at combustion ($T_c$) of greater than or equal to about 1400K (1,127° C.) to less than or equal to about 1700K (1,427° C.).

In a further variation, a cool burning gas generant composition is contemplated for an automotive inflatable restraint system comprising copper cyanurate dihydrate, a co-fuel comprising guanidine nitrate, an oxidizer comprising basic copper nitrate, one or more gas generant additives, wherein a maximum flame temperature at combustion ($T_c$) is less than or equal to about 1700K (1,427° C.). The copper cyanurate dihydrate is optionally present at greater than or equal to about 5% by weight to less than or equal to about 30% by weight of the gas generant composition, the co-fuel comprising guanidine nitrate may be present at greater than or equal to about 15% to less than or equal to about 50% by weight of the total gas generant composition, the oxidizer comprising basic copper nitrate may be present at greater than or equal to about 25% to less than or equal to about 70% by weight of the total gas generant composition, and the one or more gas generant additives may be present at greater than or equal to 0% to less than or equal to about 15% by weight of the total gas generant composition. Such a cool burning gas generant composition may have one or more of the following: (i) a gas yield of the gas generant of greater than or equal to about 5.7 moles/100 cm$^3$; (ii) a linear burn rate of greater than or equal to about 18 mm per second at a pressure of about 10 megapascals (MPa); and/or (iii) a linear burn rate pressure exponent of less than or equal to about 0.35.

Various embodiments of the inventive technology can be further understood by the specific examples contained herein. Specific non-limiting Examples are provided for illustrative purposes of how to make and use the compositions, devices, and methods according to the present teachings.

Example 1

Gas generants are tested that include a cool burning hydrate fuel compound having a water release temperature of greater than or equal to about 140° C. More specifically, gas generant compositions designated Mix 1 and Mix 2 comprising copper cyanurate dihydrate are tested to assess the effect of the copper cyanurate dihydrate on the flame temperature, and gas yield of gas generant formulations containing basic copper nitrate (bCN) and guanidine nitrate (GuNO$_3$) as the main ingredients, along with a small percentage of ammonium perchlorate co-oxidizer and silicon dioxide (SiO$_2$) as a slagging agent. The compositions and experimental results are shown in Table 1.

TABLE 1

|  | Mix 1 | Mix 2 |
| --- | --- | --- |
| % bCN | 46.92 | 49.02 |
| % guanidine nitrate | 37.08 | 22.98 |
| % copper cyanurate dihydrate | 13.5 | 25.5 |
| % SiO$_2$ | 1 | 1 |
| % Ammonium Perchlorate | 1.5 | 1.5 |
| Tc (K) | 1594 | 1406 |
| Gravimetric gas yield (moles/100 g) | 2.67 | 2.5 |
| Density (g/cc) | 2.17 | 2.3 |
| Volumetric Gas Yield moles/100 cm$^3$ | 5.8 | 5.75 |

Example 2

Gas generants are tested that include a cool burning hydrate fuel compound having a water release temperature of greater than or equal to about 140° C. More specifically, gas generant compositions designated Mix 3 and Mix 4 comprising copper melamine oxalate dihydrate are tested for flame temperature and gas yield of gas generant formulations containing basic copper nitrate (bCN) and guanidine nitrate (GuNO$_3$) as the main ingredients, along with a small percentage of ammonium perchlorate co-oxidizer and silicon dioxide (SiO$_2$) as a slagging agent. The compositions and experimental results are shown in Table 2.

TABLE 2

|  | Mix 3 | Mix 4 |
| --- | --- | --- |
| % bCN | 49.39 | 51.27 |
| % guanidine nitrate | 26.61 | 16.23 |
| % copper melamine oxalate dihydrate | 21.5 | 30 |
| % $SiO_2$ | 1 | 1 |
| % Ammonium Perchlorate | 1.5 | 1.5 |
| Tc (K) | 1601 | 1448 |
| Gravimetric gas yield (moles/100 g) | 2.51 | 2.31 |
| Density (g/cc) | 2.3 | 2.47 |
| Volumetric Gas Yield moles/100 $cm^3$ | 5.76 | 5.7 |

Example 3

Gas generants are tested that include a cool burning hydrate fuel compound having a water release temperature of greater than or equal to about 140° C. More specifically, gas generant compositions designated Mix 5 and Mix 6 comprising copper malonate hydrate are tested for flame temperature and gas yield of gas generant formulations containing basic copper nitrate (bCN) and guanidine nitrate ($GuNO_3$) as the main ingredients, along with a small percentage of ammonium perchlorate co-oxidizer and silicon dioxide ($SiO_2$) as a slagging agent. The compositions and experimental results are shown in Table 3. Notably, low maximum flame temperatures can be achieved, for example, in Mix 6, of about 1405K, although the volumetric gas yield may be somewhat reduced in such embodiments.

TABLE 3

|  | Mix 5 | Mix 6 |
| --- | --- | --- |
| % bCN | 44.55 | 44.55 |
| % guanidine nitrate | 31.7 | 20.45 |
| % copper malonate hydrate | 21.25 | 32.5 |
| % $SiO_2$ | 1 | 1 |
| % Ammonium Perchlorate | 1.5 | 1.5 |
| Tc (K) | 1604 | 1405 |
| Gravimetric gas yield (moles/100 g) | 2.54 | 2.3 |
| Density (g/cc) | 2.24 | 2.38 |
| Volumetric Gas Yield moles/100 $cm^3$ | 5.69 | 5.47 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gas generant composition for an automotive inflatable restraint system comprising a cool burning hydrate fuel comprising carbon, hydrogen, oxygen, and a transition metal, wherein the cool burning hydrate fuel is present at greater than or equal to about 5% by weight to less than or equal to about 50% by weight of the gas generant composition, and the cool burning hydrate fuel is a transition metal salt of an organic compound or a transition metal complex salt of an organic compound that:
    (i) comprises at least one functional group selected from the group consisting of: amide, imide, hydroxyl, carboxylic acid, and combinations thereof;
    (ii) has an oxygen-to-carbon mole ratio of greater than or equal to about 0.5;
    (iii) comprises at least one-half a water molecule of hydration; and
    (iv) has an exothermic heat of formation of at least about −400 KJ/mole,
    wherein the cool burning hydrate fuel further comprises nitrogen.

2. The gas generant composition of claim 1, wherein the cool burning hydrate fuel has a water release temperature of greater than or equal to about 140° C. measured by differential scanning calorimetry (DSC) with a heating rate of 5° C./minute with a tolerance of ±0.1° C./minute.

3. A gas generant composition for an automotive inflatable restraint system comprising a cool burning hydrate fuel comprising carbon, hydrogen, oxygen, and a transition metal, wherein the cool burning hydrate fuel is present at greater than or equal to about 5% by weight to less than or equal to about 50% by weight of the gas generant composition, and the cool burning hydrate fuel is a transition metal salt of an organic compound or a transition metal complex salt of an organic compound that:
    (i) comprises at least one functional group selected from the group consisting of: amide, imide, hydroxyl, carboxylic acid, and combinations thereof;
    (ii) has an oxygen-to-carbon mole ratio of greater than or equal to about 0.5;
    (iii) comprises at least one-half a water molecule of hydration; and
    (iv) has an exothermic heat of formation of at least about −400 KJ/mole,
    wherein the cool burning hydrate fuel is selected from the group consisting of: a copper cyanurate dihydrate, a copper melamine oxalate dihydrate, a copper malonate hydrate, and combinations thereof.

4. The gas generant composition of claim 1, further comprising a co-fuel present at greater than or equal to about 10% to less than or equal to about 50% by weight of the total gas generant composition; an oxidizer present at greater than or equal to about 25% to less than or equal to about 70% by weight of the total gas generant composition; and one or more gas generant additives present at greater than or equal to 0% to less than or equal to about 15% by weight of the total gas generant composition.

5. The gas generant composition of claim 1, wherein the cool burning hydrate fuel is present at greater than or equal to about 5% by weight to less than or equal to about 30% by weight of the gas generant composition.

6. The gas generant composition of claim 4 having a maximum flame temperature at combustion ($T_c$) of greater than or equal to about 1400K (1,127° C.) to less than or equal to about 1700K (1,427° C.).

7. The gas generant composition of claim 4 having one or more of the following:
    (i) a gas yield of the gas generant composition of greater than or equal to about 5.7 moles/100 $cm^3$;
    (ii) a linear burn rate of greater than or equal to about 18 mm per second at a pressure of about 10 megapascals (MPa); or
    (iii) a linear burn rate pressure exponent of less than or equal to about 0.35.

8. The gas generant composition of claim 1, further comprising a co-fuel selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof.

9. The gas generant composition of claim 1, further comprising an oxidizer is selected from the group consisting of: basic copper nitrate, alkali metal or alkaline earth metal nitrates, alkali metal, alkaline earth metal, or ammonium perchlorates, metal oxides, and combinations thereof.

10. The gas generant composition of claim 1, further comprising a co-fuel comprising guanidine nitrate present at greater than or equal to about 15% to less than or equal to about 50% by weight of the total gas generant composition and an oxidizer comprising basic copper nitrate present at greater than or equal to about 25% to less than or equal to about 70% by weight of the total gas generant composition.

11. A cool burning gas generant composition for an automotive inflatable restraint system comprising a co-fuel, an oxidizer, one or more gas generant additives, and a cool burning hydrate fuel,
  wherein the cool burning hydrate fuel is selected from the group consisting of: a copper cyanurate dihydrate, a copper melamine oxalate dihydrate, a copper malonate hydrate, and combinations thereof, the cool burning hydrate fuel is present at greater than or equal to about 5% by weight to less than or equal to about 50% by weight of the cool burning gas generant composition,
  the co-fuel is present at greater than or equal to about 10% to less than or equal to about 50% by weight of the total gas generant composition,
  the oxidizer is present at greater than or equal to about 25% to less than or equal to about 70% by weight of the total gas generant composition,
  the one or more gas generant additives present at greater than or equal to 0% to less than or equal to about 15% by weight of the total gas generant composition, and
  a maximum flame temperature at combustion ($T_c$) is less than or equal to about 1700K (1,427° C.).

12. The cool burning gas generant composition of claim 11 having one or more of the following:
  (i) a gas yield of the cool burning gas generant composition of greater than or equal to about 5.7 moles/100 cm$^3$;
  (ii) a linear burn rate of greater than or equal to about 18 mm per second at a pressure of about 10 megapascals (MPa); or
  (iii) a linear burn rate pressure exponent of less than or equal to about 0.35.

13. The cool burning gas generant composition of claim 11, further comprising a co-fuel selected from the group consisting of: guanidine nitrate, diammonium 5,5'-bitetrazole (DABT), copper bis guanylurea dinitrate, hexamine cobalt (III) nitrate, copper diammine bitetrazole, and combinations thereof and an oxidizer is selected from the group consisting of: basic copper nitrate, alkali metal or alkaline earth metal nitrates, alkali metal, alkaline earth metal, or ammonium perchlorates, metal oxides, and combinations thereof.

14. A cool burning gas generant composition for an automotive inflatable restraint system comprising copper cyanurate dihydrate, a co-fuel comprising guanidine nitrate, an oxidizer comprising basic copper nitrate, one or more gas generant additives, wherein a maximum flame temperature at combustion ($T_c$) is less than or equal to about 1700K (1,427° C.).

15. The cool burning gas generant composition of claim 14, wherein the copper cyanurate dihydrate is present at greater than or equal to about 5% by weight to less than or equal to about 30% by weight of the cool burning gas generant composition, the co-fuel comprising guanidine nitrate is present at greater than or equal to about 15% to less than or equal to about 50% by weight of the total cool burning gas generant composition, the oxidizer comprising basic copper nitrate present at greater than or equal to about 25% to less than or equal to about 70% by weight of the total cool burning gas generant composition, and the one or more gas generant additives are present at greater than or equal to 0% to less than or equal to about 15% by weight of the total cool burning gas generant composition.

16. The cool burning gas generant composition of claim 14, having one or more of the following:
  (i) a gas yield of the cool burning gas generant composition of greater than or equal to about 5.7 moles/100 cm$^3$;
  (ii) a linear burn rate of greater than or equal to about 18 mm per second at a pressure of about 10 megapascals (MPa); or
  (iii) a linear burn rate pressure exponent of less than or equal to about 0.35.

17. The cool burning gas generant composition of claim 11, wherein the cool burning hydrate fuel includes at least one of the copper melamine oxalate dihydrate, the copper malonate hydrate, and combinations thereof.

18. The cool burning gas generant composition of claim 11, wherein the cool burning hydrate fuel includes the copper melamine oxalate dihydrate.

19. The cool burning gas generant composition of claim 11, wherein the cool burning hydrate fuel includes the copper malonate hydrate.

* * * * *